(No Model.) 3 Sheets—Sheet 1.

N. STURDY.
POTATO DIGGER.

No. 521,057. Patented June 5, 1894.

WITNESSES:
Chas. Nisia
C. Sedgwick

INVENTOR
N. Sturdy
BY
Munn & Co.
ATTORNEYS.

(No Model.) 3 Sheets—Sheet 2.

N. STURDY.
POTATO DIGGER.

No. 521,057. Patented June 5, 1894.

WITNESSES:
Chas. Nida.
C. Sedgwick.

INVENTOR
N. Sturdy
BY Munn & Co.
ATTORNEYS.

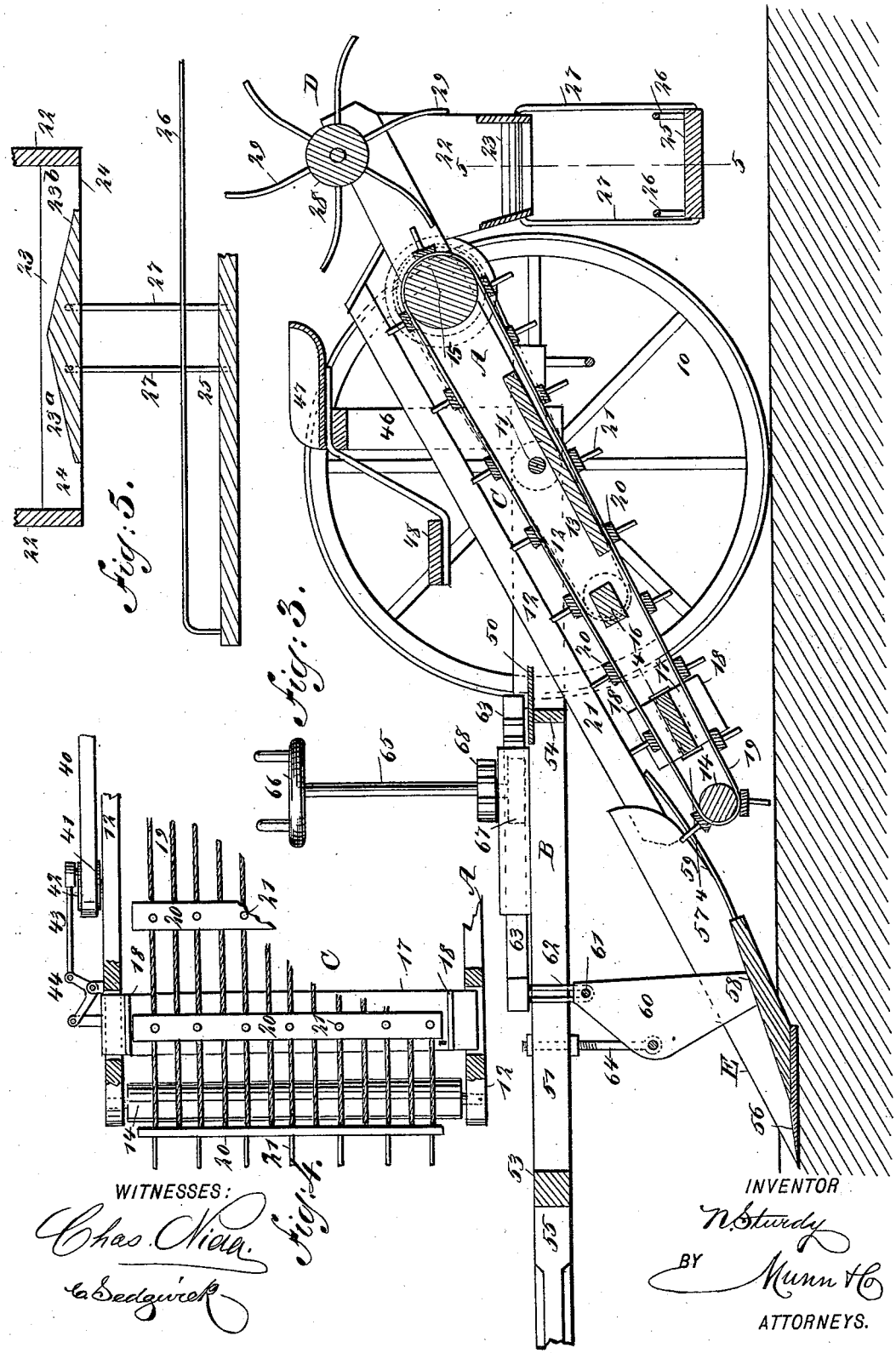

UNITED STATES PATENT OFFICE.

NATHAN STURDY, OF CHICAGO, ILLINOIS.

POTATO-DIGGER.

SPECIFICATION forming part of Letters Patent No. 521,057, dated June 5, 1894.

Application filed July 11, 1893. Serial No. 480,120. (No model.)

*To all whom it may concern:*

Be it known that I, NATHAN STURDY, of Chicago, in the county of Cook and State of Illinois, have invented a new and Improved Potato-Digger, of which the following is a full, clear, and exact description.

My invention relates to an improvement in potato diggers, and it has for its object to construct a machine in such manner that a shovel will be provided for removing the potatoes from the ground, which shovel may be adjusted as desired. In addition to the shovel an elevator is provided which receives the potatoes together with the vines or roots that may cling to them, which elevator is given a vibratory motion in order to discharge the dirt remaining upon the roots or the potatoes. The elevator delivers the potatoes into a hopper from whence they are directed to receptacles placed on a platform at the rear of the machine.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1:
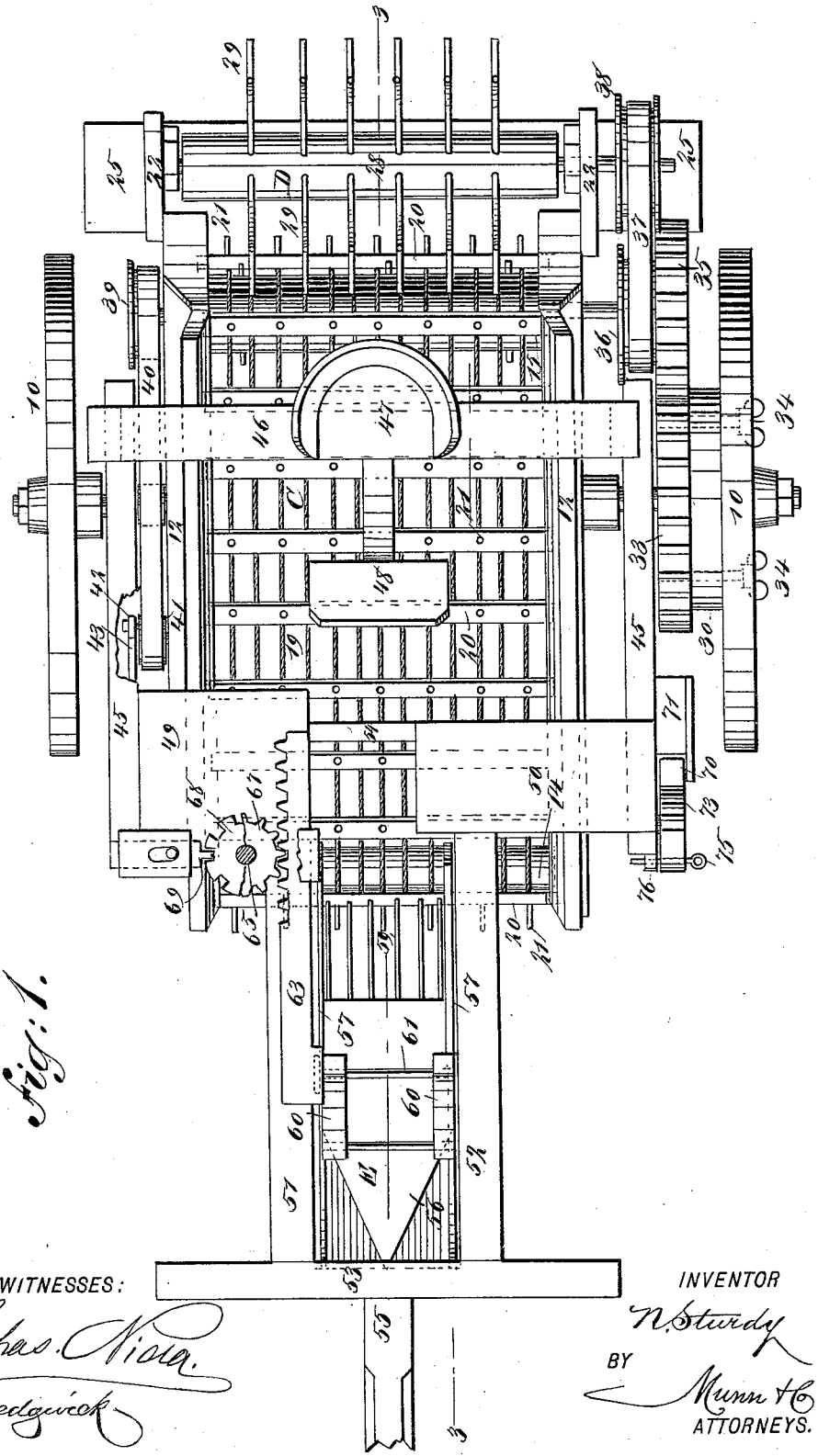
Figure 2:
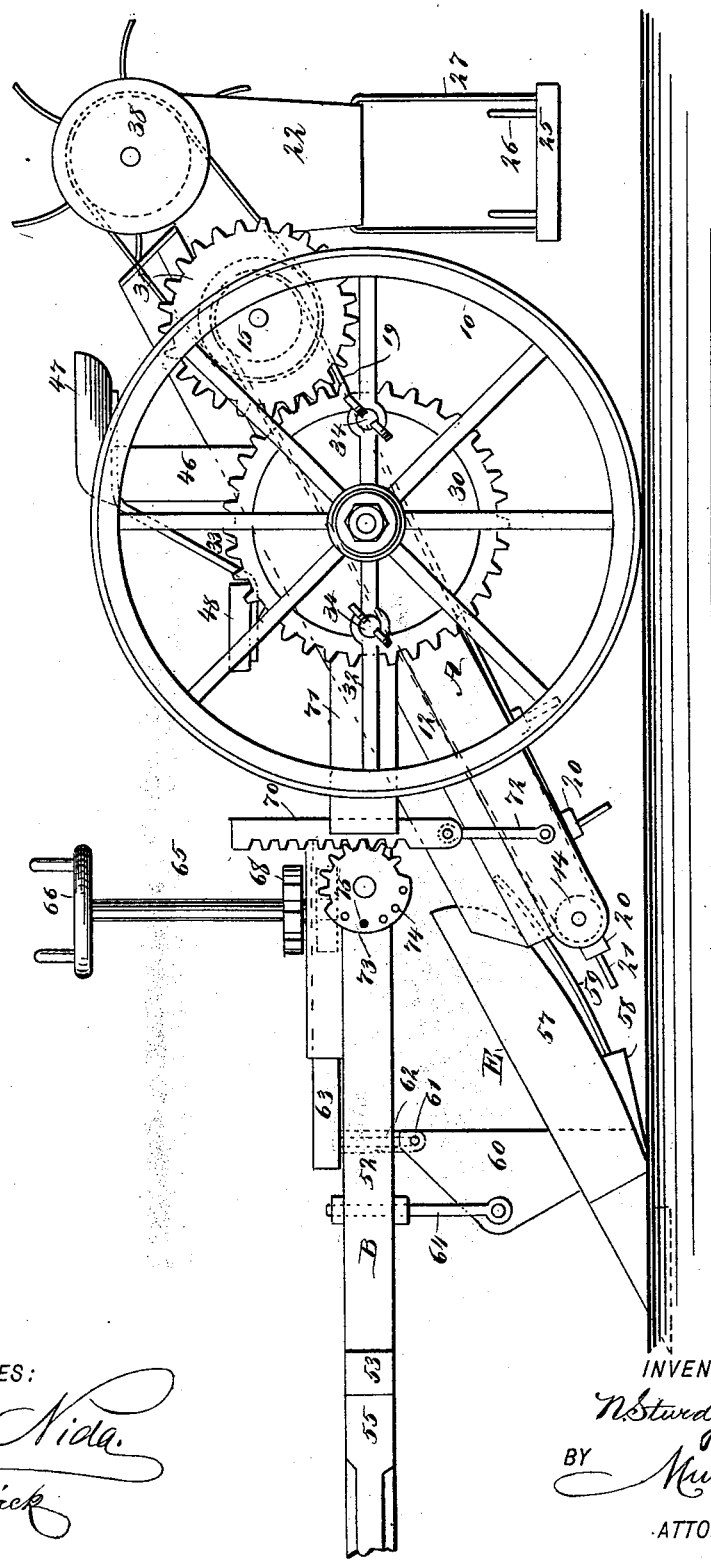

Figure 1 is a plan view of the machine. Fig. 2 is a side elevation thereof. Fig. 3 is a longitudinal section, taken practically on the line 3—3 of Fig. 1. Fig. 4 is a detail view of a portion of the elevator, with parts in section on the line 4—4 in Fig. 3; and Fig. 5 is a sectional view of the hopper and the platform located beneath it, on the line 5—5 in Fig. 3.

In carrying out the invention, two supporting wheels 10, are loosely mounted upon the axle 11. This axle is adapted to carry two frames, an elevator frame A and a draft frame B, both the said frames being pivoted upon the axle. The elevator frame comprises two side bars or beams 12 of any desired height, which side bars are pivoted upon the axle, as shown in Fig. 3, and extend both forwardly and rearwardly therefrom. The side bars are connected by means of a transverse board 13, located at or near the center of the side bars, and preferably below the axle; while in the lower end of the frame thus constructed a drum or roller 14, is journaled, a second and larger drum or roller 15 being journaled within the upper end of the frame. The side bars of the frame A, are also preferably connected by means of a cross bar 16, and a predetermined distance back of the lower roller or drum 14 a shaker bar 17, extends transversely across the frame, and has sliding movement at its ends in the side bars of the frame, as is best shown in Fig. 4, the said shaker bar being provided near its ends with flanges 18, extending from both its upper and lower faces, but the flanges may be made to extend from the upper face only if in practice it is found desirable.

The frame A is adapted to carry an elevator C. This elevator consists of a series of bands or cables 19, which bands or cables are endless and are arranged parallel to each other; and the said bands or cables extend over both the lower drum or roller 14 and the upper one 15. The bands or cables are connected at intervals by a series of transverse bars 20, the bars being secured to the cables in any suitable or approved manner, and a series of pins 21, is projected from the outer faces of the cross bars. The space between transversely opposing flanges 18 on the shaker bar is slightly greater than necessary to receive between the said flanges the cross bars 20 of the belt, and it is obvious that when a laterally reciprocating movement is imparted to the shaker bar its flanges will alternately engage with opposite ends of the elevator cross bars, passing over the shaker, and impart a laterally reciprocating movement to the elevator. In this manner any earth or loose foreign matter, such as roots and vines, that may have been delivered with the potatoes to the elevator will be shaken down between the strands of the elevator, and will fall upon the ground. At the extreme rear end of the frame of the elevator, hangers 22, are projected downward from the frame, and the said hangers support at their lower ends a trough 23. The trough is located transversely of the machine, and is provided with a bottom surface inclined from its center in direction of the ends of the trough, the inclined surfaces being designated in Fig. 5 as 23ᵃ and 23ᵇ; and at each end of the trough an opening 24, is produced, so that the material delivered to the trough will pass down the inclined faces of the bottom, and escape through the openings 24. In the event receptacles are not placed beneath the openings 24 to receive the potatoes the potatoes would drop upon the ground, and therefore a platform 25, is located beneath the trough or chute, the platform being preferably made of greater length than the width of the body of the machine, or the length of the trough. This platform may be of any desired width, and it is provided at each side with a guard rail 26, or its equivalent, the platform being supported by hangers 27, secured preferably to the central portion of the platform and to the corresponding portion of the trough. This platform is adapted to carry sacks, hampers, or other receptacles capable of receiving potatoes and in which it is usual to transport them from place to place. The platform is sufficiently long to provide for empty receptacles being placed upon its central portion, while the receptacle to be filled will be placed one beneath each discharge opening 24 of the trough; and by this means when the receptacles have been filled they may be readily removed and emptied, and empty ones may be drawn from the center in a convenient manner to take their places, and other empty receptacles will be placed upon the central portion of the platform.

It is very desirable that the potatoes should be delivered to the discharging trough 23, freed from as much foreign matter as possible; to that end, a cleaning wheel D, is journaled in bearings formed upon the upper and preferably extreme rear end portion of the bracket extension 22 of the elevator frame. This cleaning wheel consists of a cylindrical body 28, of a length practically corresponding to the width of the elevator frame, and series of teeth 29, which radiate from the cylindrical body of the wheel, the teeth being curved at their outer extremities, all in the same direction, the curve being such that when the teeth are in the lower position their concaved faces will be in direction of the front of the machine; while when the teeth are in upper position the concaved surfaces face to the rear. The teeth upon the cleaning wheel are so placed that in a cross section of the wheel they will appear to radiate from all sides; and the location of the wheel is such that as it revolves its teeth will pass upward between the pins upon the descending cross bar 20 of the elevator. In this manner it is obvious that the teeth of the cleaning wheel will remove from the elevator any roots or vines that may have been carried upward by the elevator, and the curving of the outer extremities of the teeth will insure the teeth carrying the material received over to the extreme back portion of the machine without dropping any of the material, and when the teeth descend, the material carried will be discharged and will fall upon the ground at the rear of the trough and the platform 25.

The driving of the elevator and of the cleaning wheel is accomplished in the following manner: One of the drive wheels, the left-hand wheel, for example, has secured upon its inner face a block 30, preferably of disk-like shape, and the block is provided with apertures, shown in dotted lines in Fig. 1, which register with apertures made in two of the spokes 32 of the wheel, the spokes being preferably diametrically opposite. A driving gear 33, is loosely mounted upon the axle, and is driven only when connected with the left-hand drive wheel. This connection is effected by passing screws 34 through the apertures in the spokes 32 of the wheel, through the apertures in the block 30 attached to the wheel, and into apertures or openings made in the driving gear. The inner ends only of the bolts or screws 34 need be threaded, while their outer ends or heads are formed as a wing-nut, or have corresponding formation, whereby they may be turned either with the fingers or by the application of a wrench or other tool. The driving gear 33, meshes with a smaller gear 35 secured upon the shaft or trunnion of the upper elevator drum or roller 15; and upon the same shaft or trunnion a pulley 36, is secured, which pulley may be secured, if desired, to the gear 35, and the pulley 36, is connected by a belt 37 with a pulley 38, located upon an extension of the shaft carrying the cleaning wheel.

A pulley 39, is located upon the right-hand trunnion or right-hand extension of the upper elevator drum or roller; and this pulley 39, is connected by a belt 40 with a small pulley 41, journaled upon the outer face of the right-hand side board of the elevator frame. The said pulley has secured to it a disk carrying the crank pin 42 and the said crank pin is connected by a pitman 43, with a lever 44, preferably of elbow or angular construction, as shown in Fig. 4, the said lever being fulcrumed upon the right-hand side of the elevator frame, and it is connected with the shaker bar 17. In this manner the bar receives its movement. The belt 40, may be made to pass over a tightener, as shown in Fig. 1 if in practice it is found desirable. It will be observed that by disengaging the main driving gear 33 from the left-hand driving wheel, all of the mechanism driven by the said gear and carried by the elevator frame, will be silenced, and the machine may be readily moved from one place to another.

The draft frame B, comprises two main side bars 45, which bars are pivoted upon the axle, one at each side of the elevator frame, and extends a predetermined distance rearwardly from the axle, and upon the rear ends of these side bars a yoke-like frame 46, is erected, and the said frame extends over or across the elevator, and is adapted as a support for the driver's seat 47 and the foot rest 48 for the driver. Two platforms 49 and 50, comprise a portion of the draft frame, the platform 49 being secured for example to the right-hand side beam 45, while the platform 50, is secured to the left-hand side beam. The platforms extend in direction of each other, and both of them are carried transversely over the elevator for a predetermined distance. The platforms have secured to them two parallel beams 51 and 52, which are connected at the front by a cross bar 53, and a like cross bar 54, connects them at their rear ends. The forward beams 51 and 52 of the draft frame, are located substantially one at each side of the longitudinal center of the elevator, and the connecting bar 54 of the beams is located over the central portion of the elevator. The whiffletree, pole or shafts, or whatever device is employed for the application of the team, is connected with the front cross bar 53 of the draft frame; in the drawings a pole 55, is shown in this connection. The beams 51 and 52 may properly be designated plow beams or shovel beams, since they are adapted to support the shovel E employed for removing the potatoes from the ground.

The horizontal or cutting blade 56 of the shovel does not extend a very great distance rearward; but the sides 57 of the shovel extend from the cutting blade upward and rearward a considerable distance back of the blade; and the rear portions of the sides 57 are rounded off. The sides hold between them a bottom board 58, which rests upon the upper face of the cutting blade 56 of the shovel, the forward end of the bottom board being more or less triangular as shown in Fig. 1; and the said board has an upward and rearward inclination similar to that of the sides of the shovel. The rear end of the board serves to carry a series of tines 59, which are adapted to extend upward and rearward over the lower end of the elevator, as shown in Fig. 3. The shovel is provided with two uprights 60, of somewhat triangular shape, and the uprights are secured to the sides 57 at the rear of the cutting blade 56, and the upper ends of the two uprights 60, are connected by a rod 61, or its equivalent, and one end of the rod is headed or otherwise fitted to enter and remain within a link 62, which is projected down from a rack 63, held to slide, for example, upon the right hand shovel beam 51.

The standards or uprights 60 of the shovel are fulcrumed upon brackets 64, projected downward one from each of the shovel beams. Thus it will be observed, that by moving the rack forward or rearward the cutting surface of the shovel will be inclined downward so as to enter the ground to a greater or less degree, or the said cutting end may be canted upward, and thereby enable the machine to be drawn along the ground without operating upon it.

The rack 63, is adjacent to the platform 49, and upon this platform a vertical shaft 65, is journaled, the said shaft being preferably provided at its upper end with a hand wheel 66, while near its lower end it carries a pinion 67, meshing with the rack 63, and likewise a ratchet wheel 68, which is adapted to be engaged by a pawl 69, likewise located upon the platform, and the said pawl may be a sliding one, as shown in Fig. 1, or it may be of any well known construction.

It is oft-times desirable to raise the elevator frame at its lower end to carry it to or from the ground. This may be accomplished by means of the mechanism shown in Figs. 1 and 2, and it consists in locating a rack 70 in a vertical position in suitable guides 71, placed upon the left-hand beam 45 of the draft frame. The rack is provided with a link connection 72 with the lower end of the elevator frame, and the rack is raised or lowered, and consequently the frame of the elevator, through the medium of a pinion 73, which is rotated upon the draft frame and engages with the rack. This pinion, while circular, is preferably provided with teeth upon one-half of its peripheral surface only, and near the plain portion of the periphery series of apertures 74 are produced, through any of which a pin 75, or its equivalent, may be passed, and into a suitable socket 76, located upon the draft frame, as shown in Fig. 1. In this manner the pinion may be rocked in whatever position may be required to hold the rack in a predetermined upper or lower position.

In the operation of this machine as a whole, the shovel removes the potatoes from the ground; the potatoes, the earth clinging to them and also roots and vines, will then pass to the rear of the shovel, and when the tines are reached more or less of the dirt will be sifted out and considerable of the loose roots and vines. The material remaining upon the tines will be delivered to the elevator, and by the elevator is carried to the upper rear portion of the machine, at which point the cleaning wheel will remove the vines and roots from many of the potatoes, the earth having already been removed by the reciprocation of the elevator, and finally the potatoes drop from the elevator into the trough and out through the apertures in the ends of the troughs into hampers, baskets, or other receptacles placed to receive the potatoes and located upon the platform below the trough.

Having thus described my invention, I claim as new and desire to secure by Letters Patent—

1. In a potato digger, an endless elevator, a driving mechanism connected with the elevator, revolving the same, and a reciprocating mechanism, the same consisting of a slide having movement near one of the stretches of the elevator, and offsets, which are adapted for alternate engagement with opposite sides of the elevator, substantially as and for the purpose specified.

2. In a potato digger, the combination, with a shovel having a pivotal and adjustable support, an endless elevator belt held to revolve at the rear of the shovel, and a shaker bar passed between the stretches of the elevator belt, said bar being provided with flanges adapted for engagement with opposite sides of the belt, a driving mechanism connected with the elevator, and a reciprocating mechanism connected with the said driving mechanism and the shaker bar, of a cleaning wheel located at the rear of the elevator, provided with arms adapted to revolve in close relation to the elevator, and a trough located beneath the cleaning wheel, adapted to receive the potatoes, substantially as shown and described.

3. In a potato-digger, the combination of the horizontally sliding rack, 63, and a shaft, and pinion, 67, with the shovel, 57, the vertical, pivoted, shovel supports, 60, and elevator, and elevator frame, as shown and described for the purpose specified.

NATHAN STURDY.

Witnesses:
JOHN F. HENKLE,
MICHAEL F. KEARNEY.